(12) United States Patent
Kume et al.

(10) Patent No.: US 7,542,101 B2
(45) Date of Patent: Jun. 2, 2009

(54) DIOPTRIC ELEMENT ARRAY SUBSTRATE, IMAGE DISPLAY DEVICE AND IMAGE DISPLAY APPARATUS

(75) Inventors: Yasuhiro Kume, Kawachinagano (JP); Noriaki Ohnishi, Nara (JP); Naoko Mizusaki, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 175 days.

(21) Appl. No.: 10/949,449

(22) Filed: Sep. 24, 2004

(65) Prior Publication Data

US 2005/0068475 A1 Mar. 31, 2005

(30) Foreign Application Priority Data

Sep. 26, 2003 (JP) ............................. 2003-335246

(51) Int. Cl.
*G02F 1/1335* (2006.01)
(52) U.S. Cl. ............................. 349/5; 349/95; 349/146; 359/624
(58) Field of Classification Search .................... 349/95
See application file for complete search history.

(56) References Cited

U.S. PATENT DOCUMENTS

| | | | |
|---|---|---|---|
| 5,161,042 A | | 11/1992 | Hamada |
| 5,633,737 A | | 5/1997 | Tanaka et al. |
| 5,689,315 A | * | 11/1997 | Fushimi et al. ................. 349/5 |
| 5,808,712 A | * | 9/1998 | Hishida et al. ................ 349/95 |
| 6,144,426 A | * | 11/2000 | Yamazaki et al. ............. 349/95 |
| 2003/0072080 A1 | | 4/2003 | Ariyoshi et al. |

FOREIGN PATENT DOCUMENTS

| | | |
|---|---|---|
| JP | 2001-059963 | 3/2001 |
| JP | 2003-248189 | 9/2003 |

* cited by examiner

*Primary Examiner*—David Nelms
*Assistant Examiner*—Lucy P Chien
(74) *Attorney, Agent, or Firm*—George W. Neuner; David G. Conlin; Edwards Angell Palmer & Dodge LLP

(57) ABSTRACT

A dioptric element array substrate 10 includes: a first dioptric element array 2 having a plurality of first dioptric elements 2a arranged two-dimensionally; a second dioptric element array 4 having a plurality of second dioptric elements 4a having a first refractive index arranged two-dimensionally in one-to-one correspondence with the first dioptric elements; and a third dioptric element array 5 having a second refractive index different from the first refractive index. Principal rays of beams incident on the first dioptric element array at different angles and converged with the first dioptric element array are collimated with the second and third dioptric element arrays.

16 Claims, 8 Drawing Sheets f1 > f2

SHAPE DISTORTION DUE TO
CURING SHRINKAGE OF LENS RESIN

N1 < N2 < N3

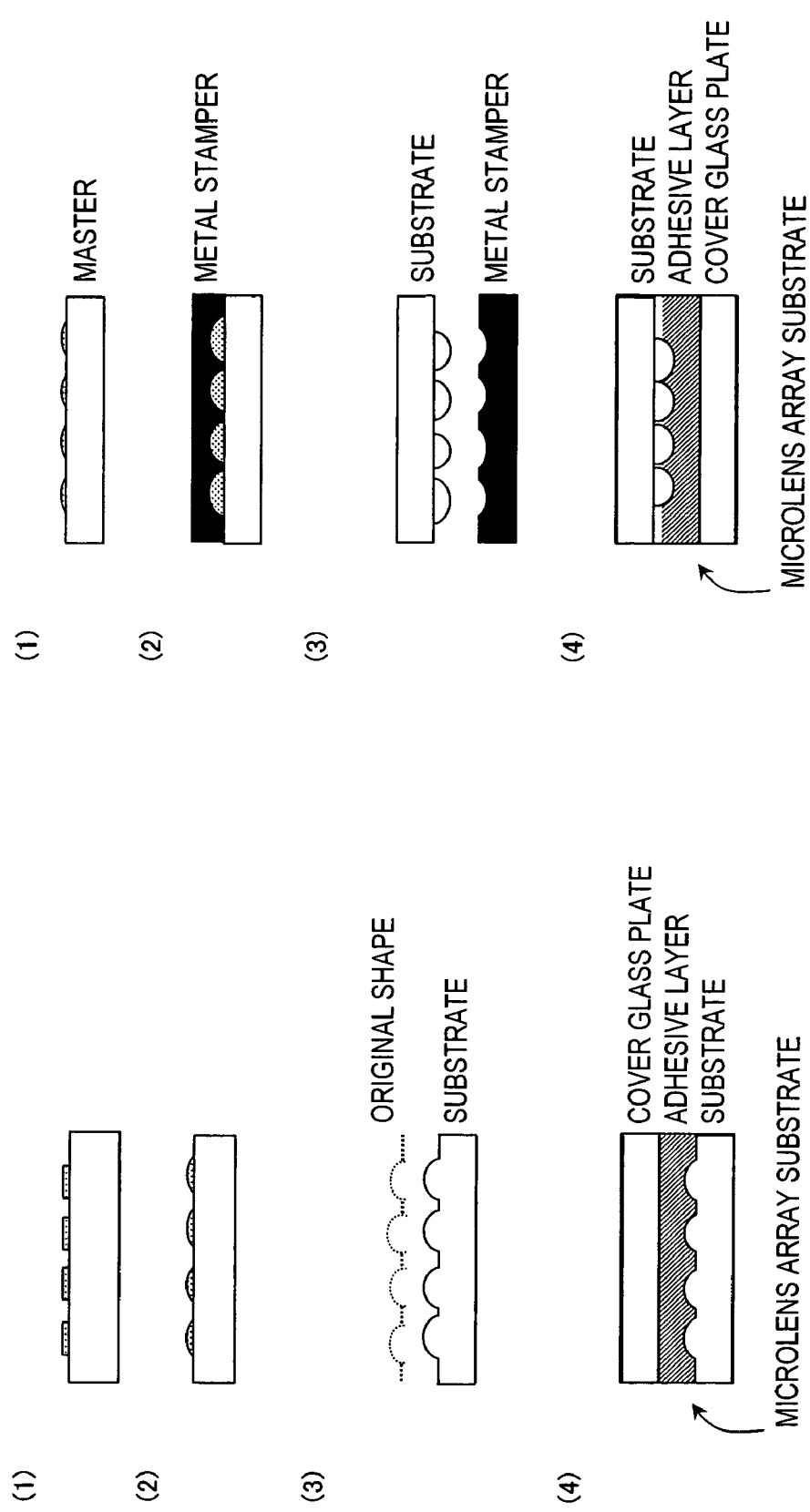

DIOPTRIC ELEMENT ARRAY SUBSTRATE, IMAGE DISPLAY DEVICE AND IMAGE DISPLAY APPARATUS

BACKGROUND OF THE INVENTION

The present invention relates to a dioptric element array substrate (microlens array substrate, for example) having dioptric elements (lenses and prisms, for example) arranged two-dimensionally, and an image display device and an image display apparatus including such a dioptric element array substrate.

In general, in non-light emitting image display apparatuses, the light transmittance (or reflectance) of each of a plurality of pixels is changed with a drive signal, to modulate the intensity of light entering an image display device (display panel) to thereby realize display of an image and a character. Such image display apparatuses include a direct view mode (direct-view image display apparatus) and a projection mode, such as a projector, in which an image and a character are magnified and projected on a screen with a projection optical system (projection image display apparatus).

As the projector (including both front and back projection types), there are a single-panel projector using a color display panel having an array of red (R), green (G) and blue (B) color filters as the image display device, and a three-panel projector using three black-and-white display panels as the image display device.

Examples of non-light emitting image display devices include liquid crystal display devices, electrochromic display devices and electrophoretic display devices. Among others, liquid crystal display devices are broadly used for monitors, PDAs, mobile phones and projectors.

In a liquid crystal display device, a drive voltage corresponding to an image signal is applied to each of pixel electrodes arranged regularly in a matrix to change the optical characteristic of the liquid crystal layer in each pixel portion, to thereby realize display of an image, a character and the like. As the method for applying independent drive voltages to pixel electrodes, there are known a simple matrix method and an active matrix method in which nonlinear two-terminal elements or three-terminal elements are provided in the liquid crystal display device.

In the active matrix method, the device includes switching elements such as metal-insulator-metal (MIM) elements and thin film transistor (TFT) elements and interconnections for supply of drive voltages to the pixel electrodes. If intense light is incident on such switching elements, the resistance of the elements in the OFF state will decrease, resulting in discharging of charges obtained during voltage application. Moreover, no normal drive voltage will be applied to portions of the liquid crystal layer corresponding to the regions in which the switching elements and the interconnections are formed, causing failure in execution of the original display operation of the device. This will cause occurrence of light leakage in the black display state, for example, arising a problem of reduction in the contrast ratio of display.

In view of the above, in a transmission liquid crystal display device, for example, a shading layer called a black matrix is formed on a TFT substrate having the switching elements and the pixel electrodes formed thereon and on a counter substrate facing the TFT substrate via the liquid crystal layer, to shade light incident on the regions described above. Accordingly, in the transmission liquid crystal display device, with the shading with the black matrix, in addition to the TFTs, gate bus lines and source bus lines individually serving as light shields, the area of the effective pixel portion in each pixel, that is, the aperture ratio decreases.

Reduction of the sizes of such switching elements and interconnections to less than certain levels is difficult due to the limitations in their electric performances, fabrication technology and the like. Therefore, as the pitch of the pixel electrodes becomes smaller with achievement of higher definition and smaller size of liquid crystal display devices, the aperture ratio further decreases.

With the decrease of the aperture ratio, the amount of light transmitting through the liquid crystal display device decreases. This causes insufficient brightness for a liquid crystal projector that projects a smaller panel on a larger screen by magnification. In particular, in a single-panel projector, the brightness greatly decreases due to light absorption by color filters.

As one method for solving the above problem, there has been implemented a method in which microlenses are provided to converge light to individual pixel portions of a liquid crystal display device, to thereby improve the effective aperture ratio of the liquid crystal display device.

Japanese Laid-open Patent Publication No. 4-60538 (Literature 1) discloses a method as follows. White light is allowed to enter dichroic mirrors arranged in a fan shape to be divided into R, G and B color beams. The resultant color beams are allowed to enter microlenses, placed on the side of a liquid crystal display device closer to the light source, at different angles, to enable the respective color beams to be converged to the corresponding pixels. By adopting this method, the effect of improving the effective aperture ratio with the microlenses can be obtained, and in addition occurrence of light absorption by color filters can be prevented.

Japanese Laid-Open Patent Publication No. 7-181487 (Literature 2) discloses a microlens array substrate having a two-layered microlens array as shown in FIG. 11. The microlens array substrate includes a structure of a first microlens array 72, a middle glass plate 73 and a second microlens array 74 sandwiched between a pair of grass substrates 71 and 75. In this array substrate, R, G and B beams are converged to enter corresponding pixel open portions with the first microlens array 72. The principal rays of the B, G and B beams are then collimated with the second microlens array 74. Thus, with the first and second microlens arrays, the amount of eclipse at the projection lens can be reduced, to further improve the brightness.

Such microlenses, which are formed inside the counter substrate of a liquid crystal display device in most cases, are sandwiched between two glass plates so that light is refracted at the interface between a glass plate and a resin layer or between two kinds of resin layers to thereby obtain the light converging effect.

Two typical methods for producing a conventional microlens array substrate will be described with reference to FIGS. 12A and 12B.

In the first production method, a microlens array substrate is produced by following the steps diagrammatically shown in FIG. 12A.

A photoresist layer on a grass substrate is patterned. (2) The patterned photoresist layer is heated to cause running of the material by heating to thereby form a resist layer having a shape of microlenses. (3) The glass substrate is subjected to dry etching together with the microlens-shaped resist layer to impart the shape of the resist layer to the glass substrate (etch-back), to thereby obtain the glass substrate with a microlens array formed on the surface. (4) A cover glass plate is bonded to the resultant substrate via an adhesive layer, and the surface of the cover glass plate is grinded, to thereby obtain a microlens array substrate. An electrode, an alignment film and the like may be formed as required.

In the second fabrication method, a microlens array substrate is fabricated by following the steps diagrammatically shown in FIG. 12B.

A photoresist layer on a glass substrate is patterned by electron beam exposure, for example, to form a resist layer having a shape of microlenses, which is to be used as a master. (2) Using the master, a metal stamper is prepared by plating, for example. (3) Using the metal stamper, the shape of microlenses is transferred to a glass substrate, to obtain a glass substrate with a microlens array formed on the surface. (4) A cover glass plate is bonded to the resultant substrate via an adhesive layer, and the surface of the cover glass plate is grinded, to thereby obtain a microlens array substrate.

The two-layered microlens array substrate disclosed in the Literature 2 has the following problem.

As described above with reference to FIGS. 12A and 12B, the microlens array substrate normally has a structure in which microlenses are formed on a glass substrate and a cover glass plate is bonded to the microlens-formed glass substrate, that is, a structure of microlenses being sandwiched between two glass substrates. The thickness of the cover glass plate is generally about 30 μm for a normal single-layered microlens array substrate.

For a two-layered microlens array substrate as disclosed in the Literature 2, the thickness of the cover glass plate (placed on the light outgoing side of the substrate) must be far smaller than 30 μm. The reason for this is as follows.

In the microlens array substrate of the Literature 2, microlenses having the same focal length are arranged in two layers from the standpoint of brightness. Accordingly, to ensure that the positions to which beams are converged with the first microlens array are very near the liquid crystal layer, the liquid crystal layer must exist just behind the second microlens array, and thus the cover glass plate placed between the second microlens array and the liquid crystal layer must be extremely thin.

It is however very difficult to extremely thin the cover glass plate. Even the thickness of the cover glass plate used for the conventional single-layered microlens array substrate is as small as about 30 μm. Such a thin cover glass plate is normally produced by first bonding a glass plate having a thickness sufficiently large compared with a desired thickness to the surface of the microlens array and then grinding the glass plate to the desired thickness.

A variation of about ±5 μm is normally produced in the thicknesses of glass plates even when the plates are of a high grade. Moreover, the grinding of the cover glass plate is made so that the total thickness from the surface of the cover glass plate to the base glass plate on which the first microlenses are formed reaches a predetermined thickness, not being made with checking of the thickness of the cover glass plate itself. Therefore, if a variation exists in the thicknesses of the base glass plates on which the first microlenses are formed, the grinding amount of the cover glass plate varies by this variation.

In the two-layered microlens array substrate, a middle glass plate is placed between the first and second microlens arrays. A variation is also produced in the middle glass plates as in the base glass plates. As in the cover glass plate described above, the middle glass plate is ground so that the total thickness reaches a desired thickness after being bonded to the substrate on which the first microlens array is formed. Therefore, only the variation in the base glass plates, if any, is reflected as the variation in the total thicknesses of the substrates obtained after the grinding of the middle glass plate.

In the production method described above, if the cover glass plate for the two-layered microlens array disclosed in the Literature 2 is extremely thinned, the cover glass plate may possibly be completely ground off due to the variation in the thicknesses of the base glass plates (about ±5 μm), resulting in damage to the second microlens array. If the thickness of the cover glass plate is set at 5 μm or more to prevent this problem, however, the beams will fail to be converged at positions very near the liquid crystal layer, that is, very near the light outgoing-side surface of the cover glass plate, resulting in low light use efficiency.

Etching of glass may be adopted as the method for thinning the cover glass plate. However, a variation in etching amounts of about ±5 μm to 10 μm also occurs in this method, and thus the same problem arises.

As described above, when the two-layered microlens array substrate of the Literature 2 is used for a liquid crystal display apparatus, the light use efficiency improves compared with the case of using the single-layered microlens array substrate of the Literature 1, but the display is not yet sufficiently bright. Moreover, the parallelism of the light outgoing from the microlens array substrate is not sufficiently high, and this results in insufficient color purity, for example. Further improvement in display quality is therefore requested.

Liquid crystal display devices were taken as an example in the above discussion on the problem related to the conventional two-layered microlens array. Occurrence of the above problem is not limited to liquid crystal display devices, but is common to microlens array substrates used for any non-light emitting display devices having display medium layers other than the liquid crystal layer. Also, the above problem occurs, not only in the microlens array substrate, but also in other dioptric element array substrates (microprism array substrate, for example) having dioptric elements arranged two-dimensionally.

In view of the above, an object of the present invention is providing an image display apparatus that is bright and excellent in display quality. Another object of the present invention is providing a dioptric element array substrate suitably used for such an image display apparatus.

SUMMARY OF THE INVENTION

The dioptric element array substrate of the present invention includes: a first dioptric element array having a plurality of first dioptric elements arranged two-dimensionally; a second dioptric element array having a plurality of second dioptric elements having a first refractive index arranged two-dimensionally in one-to-one correspondence with the plurality of first dioptric elements; and a third dioptric element array having a second refractive index different from the first refractive index, wherein principal rays of beams incident on the first dioptric element array at angles different from each other and converged with the first dioptric element array are collimated with the second dioptric element array and the third dioptric element array.

In a preferred embodiment, each of the plurality of first dioptric elements is a microlens.

In a preferred embodiment, the microlens is aspheric lens.

In a preferred embodiment, each of the plurality of second dioptric elements is a microprism having a plurality of slopes.

In another preferred embodiment, each of the plurality of second dioptric elements is a microlens.

In a preferred embodiment, the dioptric element array further includes a flattening layer on the light outgoing side of the third dioptric element array, wherein the flattening layer has a third refractive index different from the second refractive index.

In a preferred embodiment, the flattening layer is made of resin.

In a preferred embodiment, the dioptric element array substrate further includes a substrate on the light incoming side of the first dioptric element array, wherein the substrate is made of glass.

In a preferred embodiment, a relationship N1>N2>N3 is established where N1, N2 and N3 are the first, second and third refractive indexes, respectively.

In another preferred embodiment, a relationship N3>N2>N1 is established where N1, N2 and N3 are the first, second and third refractive indexes, respectively.

The image display device of the present invention includes: the dioptric element array substrate described above; and a display medium layer provided on the third dioptric element array side of the dioptric element array substrate.

In a preferred embodiment, the display medium layer includes a liquid crystal material.

The image display apparatus of the present invention includes: a light source; a color separation device for dividing a beam from the light source into a plurality of color beams having wavelength ranges different from each other; a display medium layer having a plurality of pixel portions arranged two-dimensionally, the display medium layer being irradiated with the plurality of color beams; a first dioptric element array provided on the light incoming side of the display medium layer; second and third dioptric element arrays provided between the first dioptric element array and the display medium layer; and a flattening layer provided on the side of the second and third dioptric element arrays closer to the display medium layer, wherein the first dioptric element array has a plurality of first dioptric elements arranged two-dimensionally, the second dioptric element array has a plurality of second dioptric elements having a first refractive index arranged two-dimensionally in one-to-one correspondence with the plurality of first dioptric elements, the third dioptric element array has a second refractive index different from the first refractive index, the flattening layer has a third refractive index different from the second refractive index, and principal rays of beams incident on the first dioptric element array at angles different from each other and converged with the first dioptric element array are collimated with the second dioptric element array and the third dioptric element array.

In a preferred embodiment, the display medium layer includes a liquid crystal material.

In the dioptric element array substrate of the present invention, principal rays of beams incident on the first dioptric element array at angles different from each other and converged with the first dioptric element array are collimated with the second and third dioptric element arrays. Accordingly, by use of the dioptric element array substrate of the present invention, an image display apparatus high in light use efficiency and excellent in display quality (color purity, for example) can be provided.

BRIEF DESCRIPTION OF THE DRAWINGS

FIGS. 12A and 12B are diagrammatic views for demonstrating known production methods for a microlens array substrate.

DETAILED DESCRIPTION OF THE INVENTION

Figure 1A:
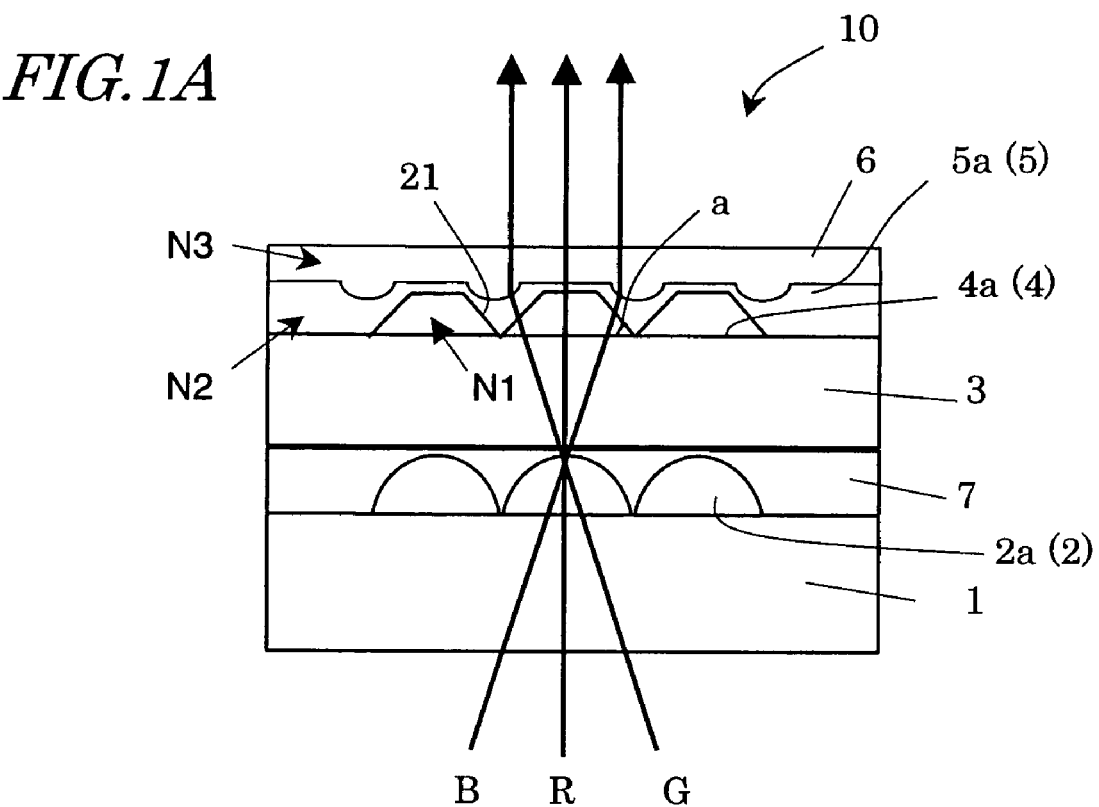
FIGS. 1A and 1B are cross-sectional views diagrammatically showing a microlens array substrate of an embodiment of the present invention.

Hereinafter, the construction and operation of a dioptric element array substrate of an embodiment of the present invention, as well as those of an image display device and an image display apparatus having such a substrate, will be described with reference to the relevant drawings. In the following description, a liquid crystal display device is taken as an example of the image display device, and a projection liquid crystal display apparatus (liquid crystal projector) is taken as an example of the image display apparatus. It should however be noted that the present invention is not limited to these examples.

First, the construction and function of a dioptric element array substrate of an embodiment of the present invention will be described with reference to FIG. 1A. Although a microlens array substrate 10 having microlenses and microprisms is shown as the dioptric element array substrate in FIG. 1A, microlenses and/or microprisms in any combination may be used as the dioptric elements.

The microlens array substrate 10 includes: a first microlens array 2 having a plurality of first microlenses 2a arranged two-dimensionally; a second microprism array 4 having a plurality of second microprisms 4a arranged two-dimensionally in one-to-one correspondence with the plurality of first microlenses 2a; a third microlens array 5; and a flattening layer 6 formed on the third microlens array 5. The second microprism array 4 has a first refractive index N1, and the third microlens array 5 has a second refractive index N2 different from the first refractive index. The flattening layer 6 has a third refractive index N3 different from the second refractive index. In this example, these refractive indexes satisfy the relationship N1>N2>N3. The flattening layer 6 may be an air layer, for example, and thus can be omitted.

A middle glass plate 3 is placed between the first microlens array 2 and the second microprism array 4. The first microlens array 2 is fixed between a base substrate 1 and the middle glass plate 3 with an adhesive layer 7.

As shown in FIG. 1A, the microlens array substrate 10 is constructed so that beams (R, G and B beams, for example) incident on the bottom surface of the base substrate 1 at different angles are converged with the first microlens array 2, and then the principal rays of these beams are collimated with one another with the second microprism array 4 and the third microlens array 5 in combination. Typically, all the principal rays outgo in the direction normal to the array substrate. With this construction having the third microlens array, it is possible to collimate rays that will otherwise fail to be collimated. For example, rays from a first microlens 2a having a short focal length will fail to be collimated with the second microprism array 4, but can be collimated with the third microlens array 5. Moreover, since the refractive indexes of the second microprisms and the third microlenses can be set so that the collimation is attained with the combination of these microprisms/microlenses, the range of choices of the material (resin, for example) for the second microprisms is advantageously extended. For example, a more reliable material can be used.

The construction of the microlens array substrate 10 of this embodiment will be described in detail with reference to FIG. 1B. Before start of this detailed description, however, problems arising in a microlens array substrate that does not include the third microlens array 5 will be described with reference to FIGS. 2A to 2C.

Figure 2A:
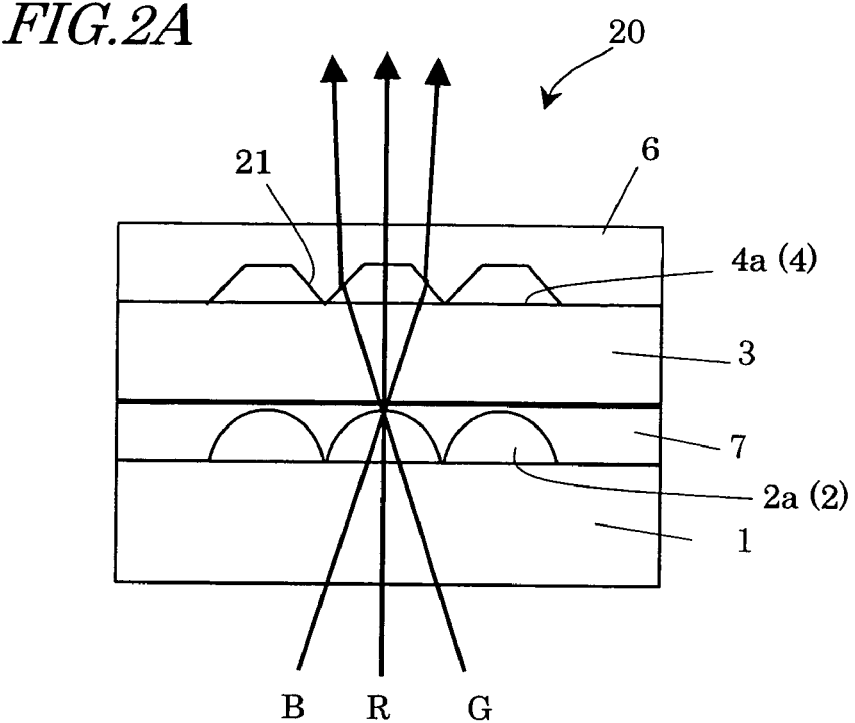
FIGS. 2A, 2B and 2C are diagrammatic views for demonstrating a problem of a microlens array substrate having no third microlens array.

Referring to FIG. 2A, a microlens array substrate 20 includes no third microlens array but includes the flattening layer 6 directly on the second microprism array 4.

The inclination angle a of slopes 21 of the second microprisms 4a is adjusted according to the incident angles of the principal rays incident on the side slopes 21 so that the principal rays outgo in the direction normal to the array substrate. R, G and B principal rays incident on the first microlens array 2 at different angles are made to outgo in the direction normal to the array substrate, to thereby collimate these principal rays.

Figure 2B:
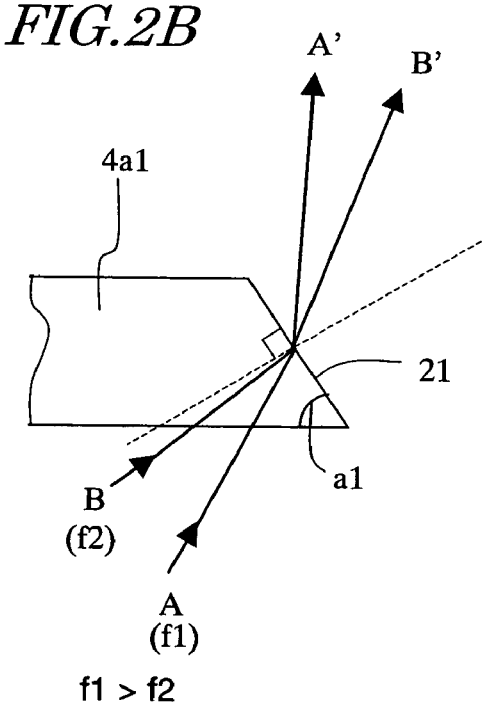

For example, as shown in FIG. 2B, a beam (principal ray) A converged with a first microlens 2a having a focal length f1 is refracted at a slope 21 of a second microprism 4a1 having an inclination angle a1 and outgoes in the direction normal to the array substrate as a beam A'. However, a principal ray B of a beam converged with a first microlens 2a having a focal length f2 (<f1) fails to outgo in the direction normal to the array substrate although being refracted at the slope 21 having the inclination angle a1, but outgoes as a beam B'. To enable the principal ray B to outgo in the direction normal to the substrate, it is necessary to use a second microprism 4a2 having a slope 21 of which an inclination angle a2 is closer to 90° than the angle a1. It is however difficult to machine a prism (or lens) having slopes large in inclination angle. The upper limit of the inclination angle is about 60° in the current machining technology.

In addition, the dioptric power will be low unless the refractive index difference (refractive index ratio) at the interface between the second microprisms 4a and the flattening layer 6 contacting with the second microprisms 4a is large to some extent. Therefore, only adjusting the inclination angle a of the second microprisms 4a may fail to lead a beam to outgo in the direction normal to the substrate. The refractive index difference at the interface between the second microprisms 4a and the flattening layer 6 is typically about 0.2 or less.

For example, in the case of using first microlenses 2a having a short focal length f for enhancing the light converging efficiency and other purposes in a liquid crystal display device to be described later, sufficient collimation with the second microprisms 4a may not be attained in some cases for the reason described above.

On the contrary, in the microlens array substrate of this embodiment, as shown in FIG. 1A, beams converged with the first microlens array 2 are collimated using the joint dioptric power (lens/prism power) of the second microprism array 4 and the third microlens array 5.

Figure 1B:
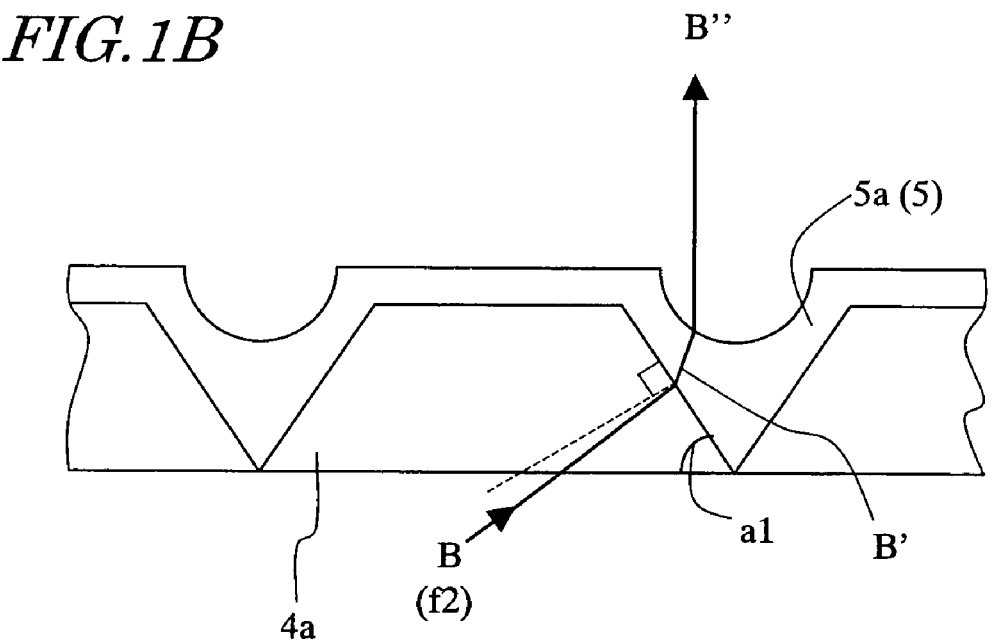
Figure 2C:
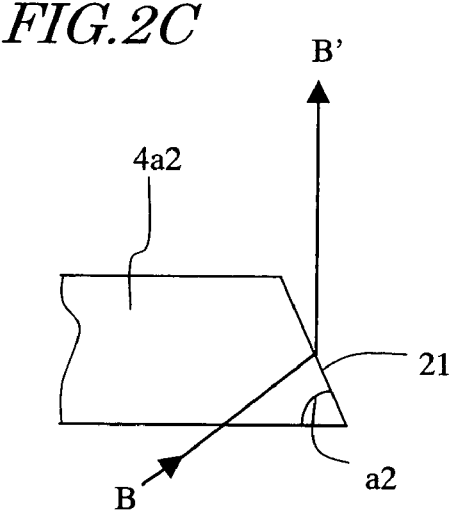

FIG. 1B is a partial enlarged view of the second microprisms 4a and the third microlenses 5a of the microlens array substrate 10. The illustrated view diagrammatically shows the case that the focal length of the first microlenses 2a is f2 (f1>f2) and the inclination angle of the second microprisms 4a is a1 (a1<a2). That is, this case corresponds to the case failing to collimate the principal rays only with the second microprisms 4a described above with reference to FIG. 2B (see the outgoing beam B' in FIG. 2B).

As shown in FIG. 1B, the beam B converged with the first microlens 2a and incident on the second microprism 4a is refracted at the slope 21 of the second microprism 4a (beam B') and further refracted with the third. microlens 5a, to outgo in the direction normal to the substrate as an outgoing beam B''. In other words, the passing direction of the beam B' that has failed to be sufficiently collimated with the second microprism 4a is corrected with the third microlens 5a to attain collimation.

A microlens array may be used in place of the second microprism array 4. In this case, the inclination angle described above may be replaced with the angle of the tangent at each point of the lenses.

Light is refracted at the interface between a lens (or prism) and a layer contacting with the lens, and the refracting angle of light is determined with the ratio in refractive index of the lens to the layer contacting with the lens and the incident angle of the light with respect to the interface. Therefore, these factors are set so that the principal rays are collimated with each other.

Figure 3:
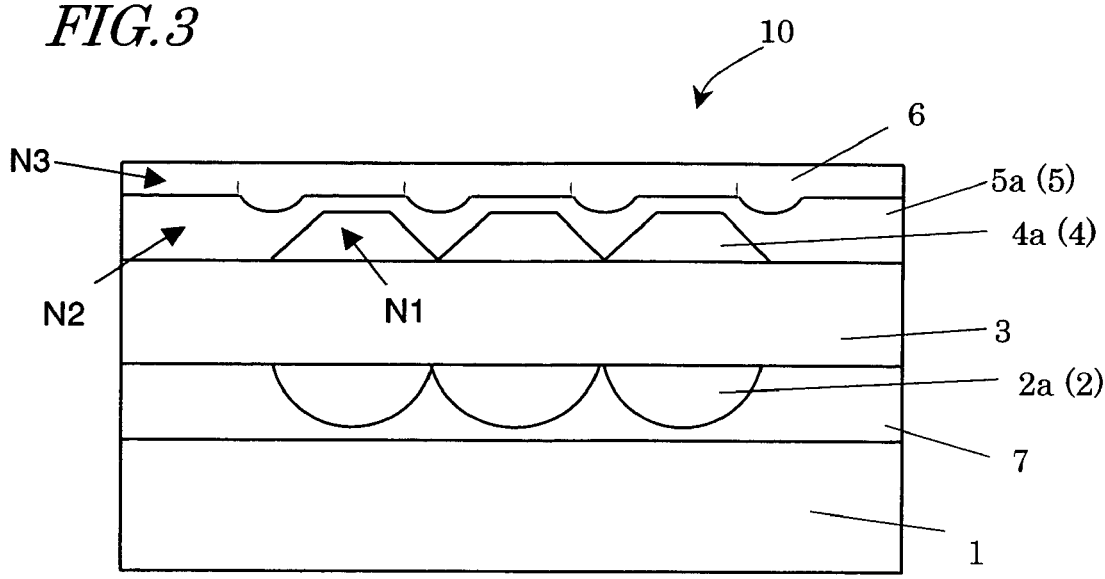
FIG. 3 is a cross-sectional view diagrammatically showing a microlens array substrate of an alteration to the embodiment of the present invention.

In the microlens array substrate 10 shown in FIG. 1A, the first microlenses 2a are placed so that the convexes thereof face toward the light outgoing side of the microlens array substrate. Alternatively, the convexes of the first microlenses 2a may face toward the light incoming side of the microlens array substrate as shown in FIG. 3.

Next, a preferred production method for the microlens array substrate 10 will be described.

The first microlens array 2 is formed on the base substrate 1 made of glass and fixed with the adhesive layer 7. The second microprism array 4 is then formed on the middle glass plate 3 formed on the first microlens array 2. The first microlens array 2 and the second microprism array 4 may be formed by known methods.

The way of forming the third microlens array 5 will be described with reference to FIGS. 4A and 4B.

Figure 4A:
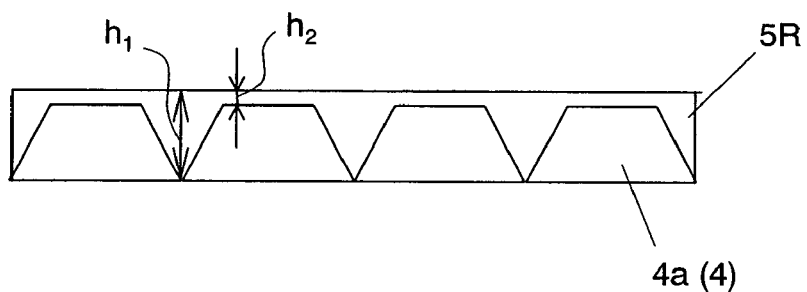
FIGS. 4A and 4B are diagrammatic views for demonstrating a production method for the microlens array substrate of the embodiment of the present invention.
Figure 4B:
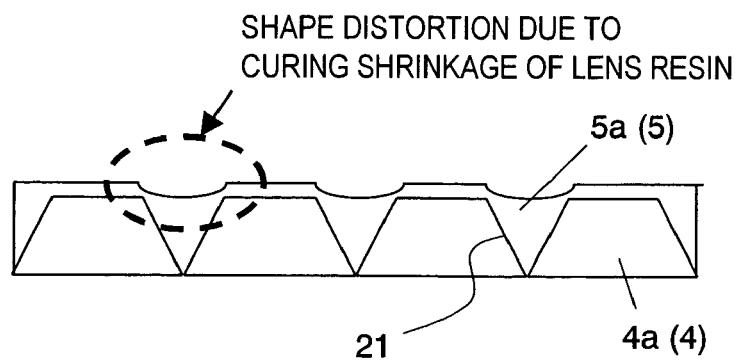

After the formation of the second microprism array 4 on the middle glass plate 3, a thermosetting resin for the third microlenses is applied to cover the second microprism array 4 and then cured to form a resin layer 5R, as shown in FIG. 4A. As the resin material for the third microlenses, selected is a material larger in refractive index than the resin material for the second microprisms.

The thermosetting resin is typically cured under the normal atmospheric pressure. The curing temperature may be set appropriately. The resin may be cured at room temperature or cured by heating. Curing shrinkage occurs in the curing process of the thermosetting resin, causing formation of dents (concaves) on the surface of the resin layer 5R. In the case of curing by heating, heat shrinkage may have an effect on the formation of the dents. These dents are formed to correspond to the gaps between the adjacent microprisms 4a of the second microprism array 4. As shown in FIG. 4A, the thickness of the resin layer 5R is larger at and near the ends of the second microprisms (h1) than at the centers thereof (h2) (h1>h2), and the effect by the curing shrinkage is greater on thicker portions. Thus, dents shaped as shown in FIG. 4B are formed on the resin layer 5R. The resin layer 5R having these dents functions as the third microlens array 5 having negative-powered concave lenses, in which the portions corresponding to the individual dents of the resin layer 5R serve as the third microlenses 5a.

The lens curvature (curvature of the concaved face of the dent) of the third microlenses 5a may be appropriately adjusted by controlling the material and thickness of the resin layer 5R, the curing temperature and the curing duration.

The production method described above permits production of the third microlens array 5 in a self-alignment manner with respect to the second microprism array by use of curing shrinkage (and heat shrinkage) of the thermosetting resin. Therefore, the production process can be advantageously simplified compared with methods using etching and the like to form dents, for example.

After the formation of the third microlens array 5, a given resin material is applied to cover the third microlens array 5 to form the flattening layer 6. As the resin material for the flattening layer 6, selected is a material larger in refractive index than the resin material for the third microlenses. The light incoming-side and light outgoing-side surfaces of the resultant microlens array substrate 10 are the glass substrate 1 and the flattening layer 6 (resin layer), respectively. Accordingly, the weight and/or thickness of the substrate can be reduced, compared with the case that both the light incoming-side and light outgoing-side surfaces are glass substrates.

Thus, the microlens array substrate 10 is produced.

In the above description, the microlens array substrate 10 satisfied the relationship N1>N2>N3 where N1, N2 and N3 are the refractive indexes of the second microprisms 4a, the third microlenses 5a and the flattening layer 6, respectively. In the microlens array substrate of the present invention, the relationship among the refractive indexes N1, N2 and N3 is not limited to this. For example, the relationship N3>N2>N1 may be satisfied. In this case, the microlens array substrate is constructed as shown in FIG. 5.

Figure 5:
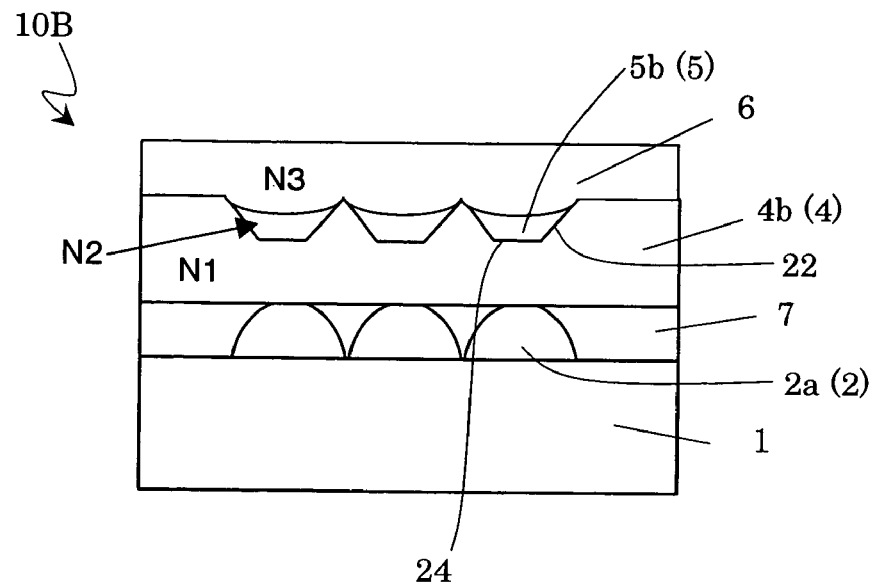
FIG. 5 is a cross-sectional view diagrammatically showing a microlens array substrate of another alteration to the embodiment of the present invention.

A microlens array substrate 10B shown in FIG. 5 includes second microprisms 4b reverse in cross-sectional shape to the second microprisms 4a of the microlens array substrate 10 of FIG. 1. That is, in the microlens array substrate 10B, the second microprism array 4 has a plurality of concaves, each composed of slopes 22 and a bottom 24, on the surface thereof. A resin layer is formed in each concave. The thickness of the resin layer gradually increases from the center of the concave toward the periphery. In other words, a dent is formed on the light outgoing-side surface of the resin layer, and thus the position of the light outgoing-side surface of the resin layer is gradually higher from the center toward the periphery. Such resin layers having dents formed in the concaves function as the third microlens array 5 having positive-powered concave lenses, in which the portions corresponding to the individual dents of the resin layers serve as third microlenses 5b.

In the microlens array substrate 10B, the second microprism array 4 is directly formed on the first microlens array 2 and the adhesive layer 7 with no interposition of the middle glass plate 3 (FIG. 1A). In the microlens array substrate 10B of FIG. 5, as in the microlens array substrate 10 of FIG. 1A, beams converged with the first microlens array 2 can be collimated using the joint dioptric power (lens/prism power) of the second microprism array 4 and the third microlens array 5. In addition, the third microlens array 5 can be produced in a self-alignment manner with respect to the second microprism array 4 by use of curing shrinkage (and heat shrinkage) of the thermosetting resin.

Figure 6:
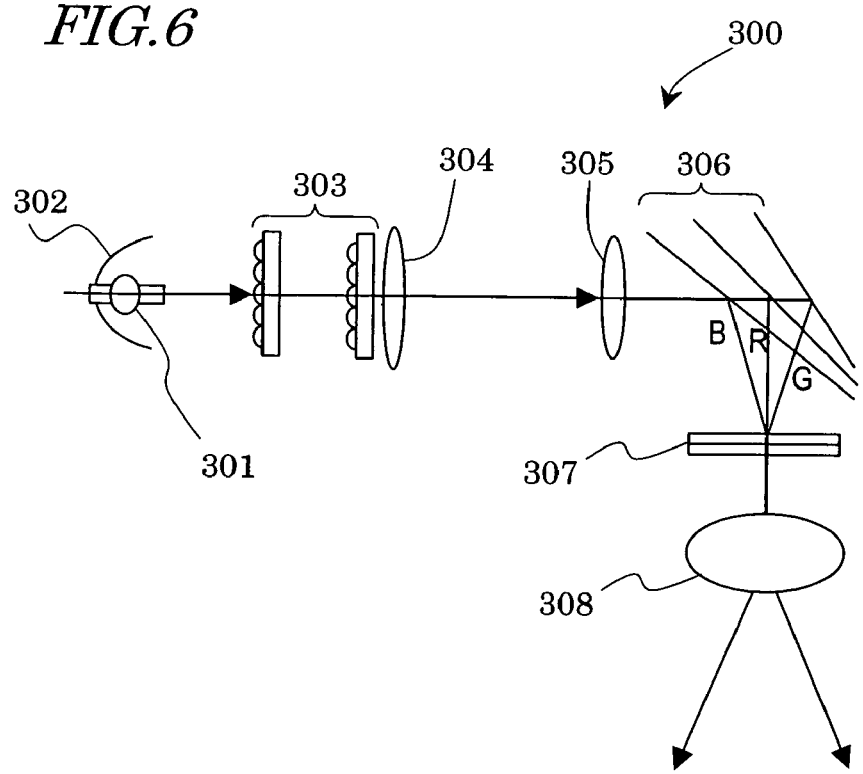
FIG. 6 is a view diagrammatically showing a construction of a liquid crystal projector of an embodiment of the present invention.

The microlens array substrate of the embodiment of the present invention can be suitably used for a liquid crystal display device of a liquid crystal projector. FIG. 6 diagrammatically shows a construction of a typical liquid crystal projector 300.

The liquid crystal projector 300 includes: a light source 301; dichroic mirrors 306 as the color separation device for dividing a beam from the light source 301 into a plurality of color beams having different wavelength ranges from each other; a liquid crystal display device 307 including a display medium layer and the microlens array substrate of the embodiment of the present invention; and a projection lens 308 for projecting light that has passed through the liquid crystal display device 307. The liquid crystal display device 307 has the microlens array substrate on the light incoming side of the display medium layer.

As the light source 301, a 120 W UHP lamp having an ark length of 1.4 mm (one from Philips, for example) may be used. A halogen lamp, a xenon lamp, a metal halide lamp and the like may also be used.

Light from the light source 301 is roughly collimated with a parabolic mirror 302, and the collimated light passes through a fry eye lens 303 and field lenses 304 and 305, to be incident on the three dichroic mirrors 306 arranged in a fan shape. The incident light is separated into R, G and B color beams with the three dichroic mirrors 306, and the color beams are allowed to enter the liquid crystal display device (panel) 307 at respective predetermined angles. The color beams are incident on their corresponding pixels (R pixels, G pixels and B pixels) of the liquid crystal display device 307 as will be described later, and modulated in the display medium layer. An image formed with the color beams modulated with the liquid crystal display device 307 is displayed on a screen (not shown), for example, by projection with the projection lens 308. As the liquid crystal display device 307, various types of devices may be used.

A construction of a liquid crystal display device suitably used as the liquid crystal display device 307 will be described with reference to FIGS. 7, 8 and 9A to 9C.

Figure 7:
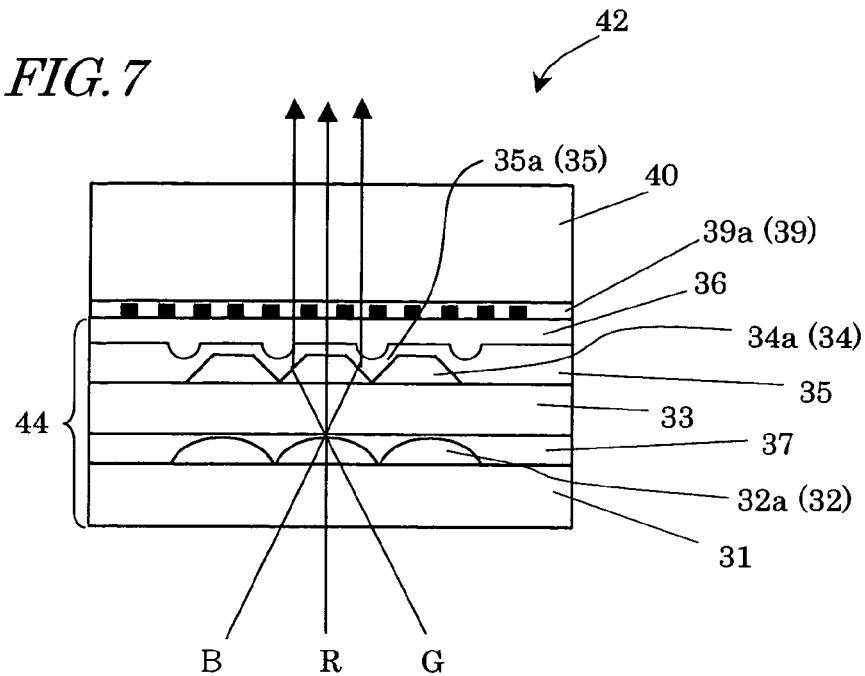
FIG. 7 is a cross-sectional view diagrammatically showing a liquid crystal display device suitably used for the liquid crystal projector of FIG. 6.

Referring to FIG. 7, a liquid crystal display device 42 includes: a microlens array substrate 44 placed on the light incoming side of the device; a liquid crystal layer 39; and a substrate (TFT substrate, for example) 40. An electrode (not shown) for applying a predetermined voltage across each pixel portion 39a of the liquid crystal layer 39 and an alignment film (not shown) as required are provided on the surface of the microlens array substrate 44 and/or the surface of the substrate 40 facing the liquid crystal layer 39. As the liquid crystal display device 42, ones of various modes can be adopted. Among others, ones of the TN mode, the MVA mode and the IPS mode can be suitably used. Liquid crystal display devices of these modes further include a pair of polarizing plates (typically placed on the top and bottom surfaces of the panel) and a phase plate as required (placed on the light outgoing side of the panel, for example) although these are not shown in FIG. 7.

The microlens array substrate 44 includes: a first microlens array 32 having first microlenses 32a arranged two-dimensionally: a second microprism array 34 having second microprisms 34a arranged two-dimensionally in one-to-one correspondence with the first microlenses 32a; a third microlens array 35; and a flattening layer 36 formed on the third microlens array 35. The second microprism array 34 has a first refractive index N1, and the third microlens array 35 has a second refractive index N2 different from the first refractive index N1. The flattening layer 36 has a third refractive index N3 different from the second refractive index N2. In this example, these refractive indexes satisfy the relationship N1>N2>N3, and specifically N1=1.59, N2=1.46 and N3=1.40, for example.

The liquid crystal display device 42 has a delta array of pixels at pitches of 21 μm×21 μm, arranged so that G and B pixels exist on the opposite sides of each R pixel. Each of the first microlenses 32a and each of the second microprisms 34a are placed to correspond to each set of three pixel portions (R, G and B pixel portions) 39a of the liquid crystal layer 39. That is, the pitches of the first microlenses 32a and the second microprisms 34a are both 63 μm (H)×21 μm (V).

The principal rays of R, G and B color beams separated with the dichroic mirrors 306 are converged with the first microlens array 32 and then collimated with the second microprism array 34 and the third microlens array 35 in combination, to be allowed to enter the corresponding pixel portions 39a (see FIG. 7).

The first microlens array 32, the second microprism array 34 and the third microlens array 35 will be described in more detail with reference to FIGS. 8 and 9A to 9C.

Figure 8:
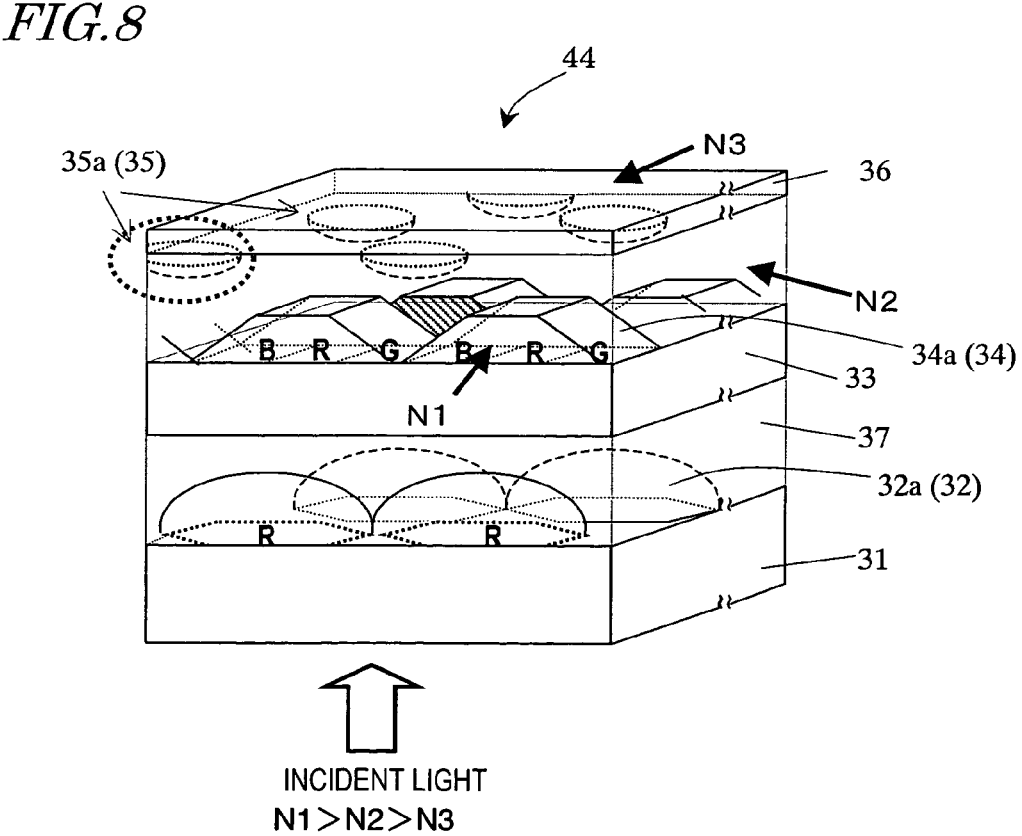
FIG. 8 is a perspective view of a microlens array substrate used for the liquid crystal display device of FIG. 7.
Figure 9A:
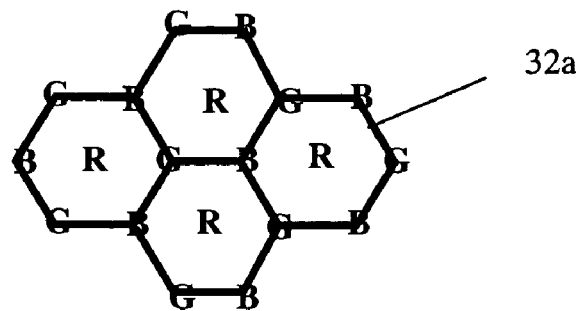
FIGS. 9A, 9B and 9C are plan views diagrammatically showing two-dimensional arrangements of first microlenses, second microprisms and third microlenses in the microlens array substrate of FIG. 8.
Figure 9B:
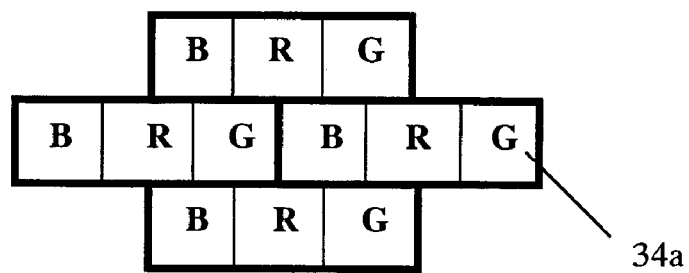
Figure 9C:
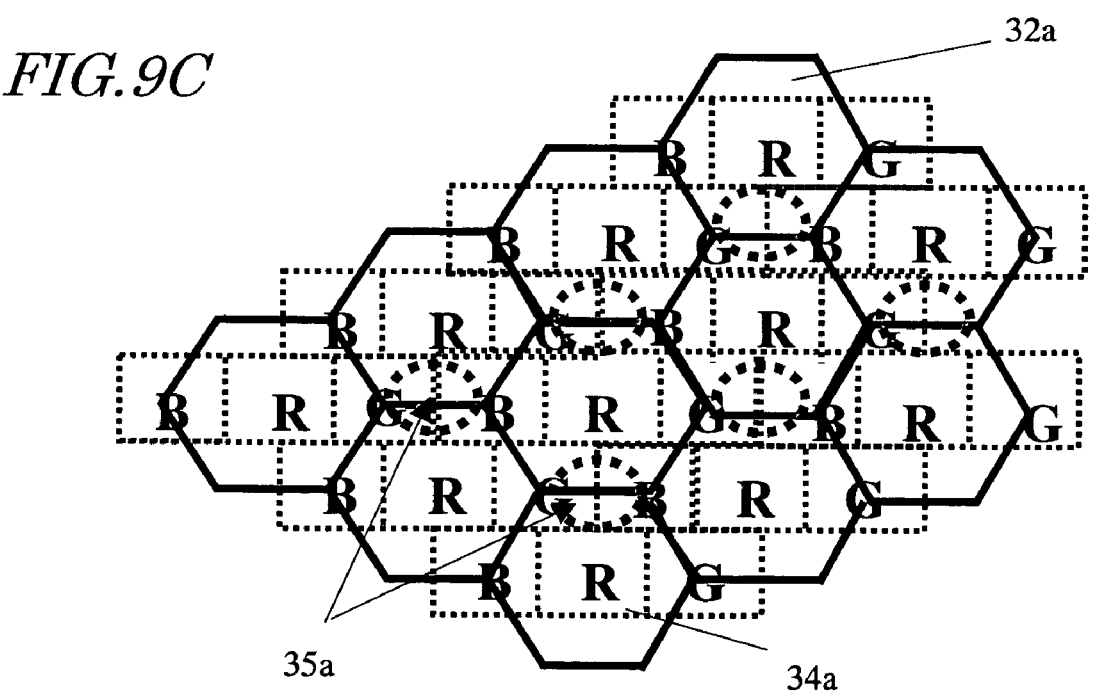

FIG. 8 is a perspective view of the microlens array substrate 44. FIG. 9A is a diagrammatic view showing the shape of the first microlenses 32a and the two-dimensional arrangement of the first microlenses 32a in the array 32. FIG. 9B is a diagrammatic view showing the shape of the second microprisms 34a and the two-dimensional arrangement of the second microprisms 34a in the array 34. FIG. 9C is a diagrammatic view showing the shapes of the first microlenses 32a, the second microprisms 34a and the third microlenses 35a and the two-dimensional arrangements of these microlenses and microprisms in their arrays.

As shown in FIGS. 9A to 9C, the first microlenses 32a and the second microprisms 34a are in one-to-one correspondence so that the centers of each first microlens 32a and each second microprism 34a match with each other. Also, in the illustrated example, the first microlenses 32a and the second microprisms 34a are placed so as to correspond to the pixels in the delta array. The centers of each first microlens 32a and each second microprism 34a match with the center of each R pixel. One third microlens 35a is placed for every pair of opposing slopes of any adjacent microprisms 34a.

The microlens array substrate for the delta-array liquid crystal display device was described. It is needless to mention that a microlens array substrate for a stripe array of pixels can also be produced in a similar manner.

The first microlenses 32a, which serve to converge light, are preferably aspheric lenses. If the first microlenses 32a have an aberration, the converging efficiency decreases. Moreover, when the first microlenses 32a are used for an image display apparatus, color mixture due to the aberration increases, causing reduction in color purity. Therefore, by making the first microlenses 32a aspheric, the aberration as a cause of reduction in brightness and color purity can be reduced.

The outside shape of the first microlenses 32a (shape as viewed from the normal to the plane defined by the two-dimensionally arranged first microlenses 32a (normal to a base substrate 31)) is a hexagon. The reason for forming the first microlenses 32a in the shape of a hexagon is that the size (diameter) of one microlens is smaller than in a rectangular one like the second microprism 34a, and this can reduce the converging angle of the microlens. If the converging angle of the first microlenses 32a is large, the amount of light that successfully passes through the liquid crystal panel but causes eclipse at the projection lens increases. This disadvantageously results in loss of brightness.

The second microprisms 34a, which serve to collimate the principal rays of beams from the corresponding first microlenses 32a, have a shape of a horizontally elongate rectangle that is different from the shape of the first microlenses 32a. This allows R, G and B color beams to pass through the corresponding pixel openings and also the principal rays of these beams to be collimated efficiently.

In the example described above, the first microlenses 32a and the second microprisms 34a were given as microlenses/prisms of different cross-sectional shapes. Alternatively, the first microlenses 32a may have the same cross-sectional shape (shape in the cross section with respect to a plane parallel to the substrate plane of the microlens array substrate) as the second microprisms 34a.

The microlens array substrate 44 described above can be produced in the following manner, for example.

A resin material for the first microlens array 32 is applied to the base substrate 31 made of glass to a thickness of 30 μm, shaped to lens curves with a glass stamper, and then cured. The height of the convex portions of the microlenses 32a after the curing of the resin material was 20 μm. An adhesive layer 37 is then deposited to fill the gaps between the adjacent convex portions of the microlenses 32a, that is, to fill the concave portions of the first microlens array 32. A material higher in refractive index than the resin material for the first microlens array 32 is used for the adhesive layer 37. A middle glass plate 33 is then placed on the adhesive layer 37, so that the adhesive layer 37 is pressed and cured with the middle glass plate 33. The middle glass plate 33 is ground as required to a desired thickness.

The method for producing the first microlens array 32 is not limited to that described above, but known methods such as ion exchange, swelling, thermal deformation, evaporation, thermal transfer and machining can be broadly used.

Thereafter, a resin material for the second microprism array 34 (for example, Z9001 from JSR Corp., N1=1.59) is formed on the middle glass plate 33 to a thickness of 30 μm. A resist film formed on the resin material is exposed to light via a mask having shades of gray according to the shape of the second microprism array (grayscale mask), to have a desired pattern. Dry etching is then performed according to the pattern, to thereby produce the second microprism array 34 having the second microprisms 34a each in the shape of a trapezoid having a height of 20 μm and an inclination angle of 50°.

The pitches of the first microlens array 32 and the second microprism array 34 are both 63 (H)×21 (V), and thus the first microlenses 32a and the second microprisms 34a are in one-to-one correspondence.

After the production of the second microprism array 34, a resin material for the third microlens array 35 (for example, JN7215 from JSR Corp., N2=1.46) is applied to fill the gaps between the adjacent trapezoidal second microprisms 34a so that the height from the top surfaces of the trapezoidal second microprisms 34a is 5 μm, and then heated to 120° C. to be cured under the normal atmospheric pressure (curing time: 60 minutes). By controlling the resin material, the film thickness, the curing temperature and the curing time as described above, curing shrinkage (and heat shrinkage) is made to occur in the resin layer for the third microlens array 35. As a result, one 5 μm deep curved dent is formed for every pair of the opposing slopes of any adjacent trapezoidal second microprisms 34a, to thereby produce the third microlens array 35. Each curved dent is in the shape of an aspheric lens, for example.

After the production of the third microlens array 35, a resin material (for example, W/R7710 from Kyoritsu Chemical & Co. Ltd., N3=1.40) is applied to a thickness of 5 μm, exposed to predetermined UV and heated (150° C.) to be cured, forming the flattening layer 36.

Thus, the microlens array substrate 44 is produced.

In the microlens array substrate 44 of the liquid crystal display device 42 described above, the first microlens array 32, the second microprism array 34 and the third microlens array 35 were used as the dioptric elements. However, the combination of the dioptric elements is not limited to this.

Figure 10:
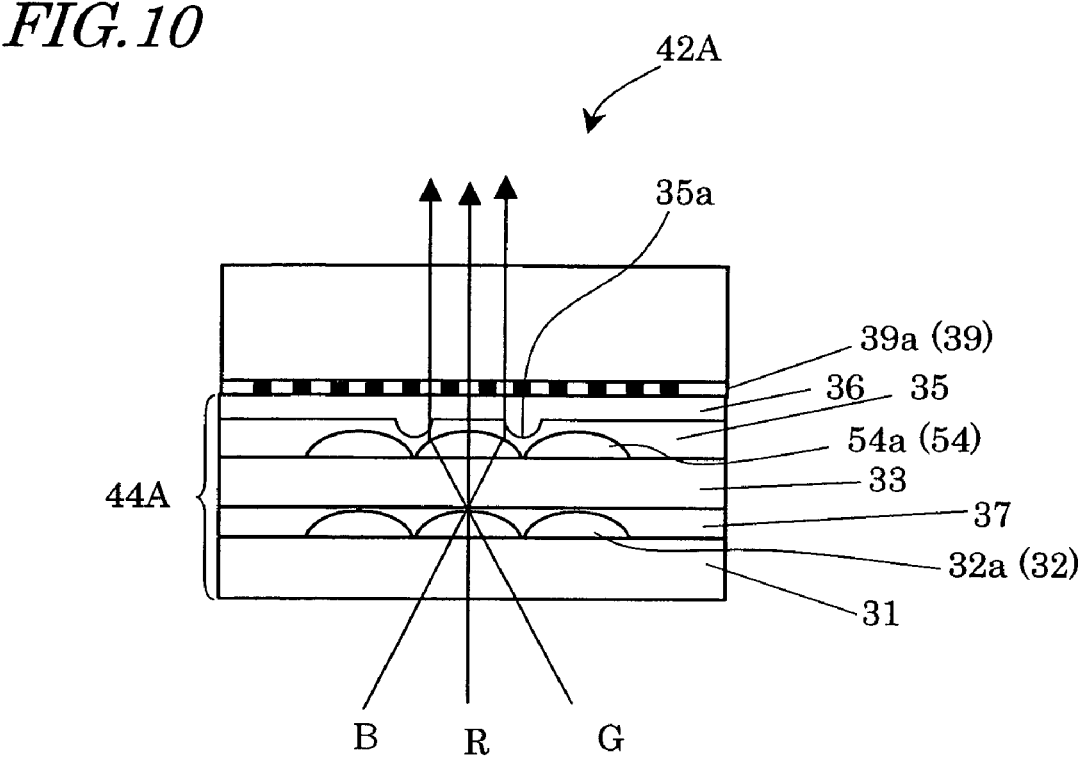
FIG. 10 is a cross-sectional view diagrammatically showing another liquid crystal display device suitably used for the liquid crystal projector of FIG. 6.
Figure 11:
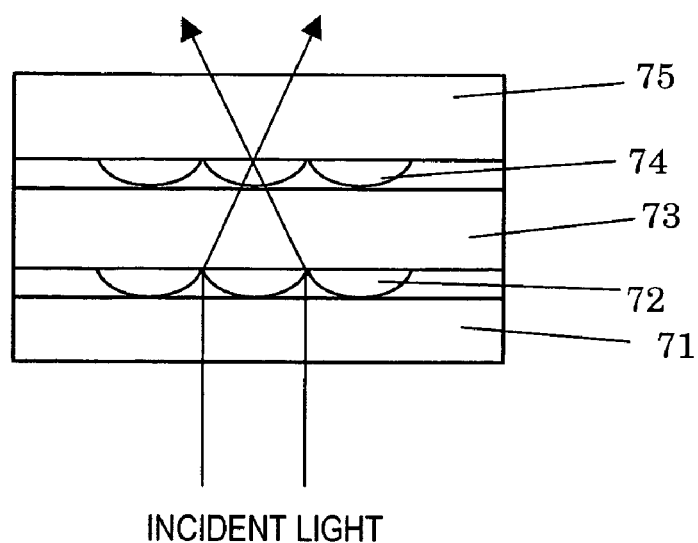
FIG. 11 is a view diagrammatically showing a conventional microlens array substrate.

For example, three microlens arrays may be used as the combination as in a microlens array substrate 44A of a liquid crystal display device 42A shown in FIG. 10. Specifically, the microlens array substrate 44A has the first microlens array 32, a second microlens array 54 and the third microlens array 35 as the dioptric elements. The second microlens array 54 has a plurality of microlenses 54a arranged in one-to-one correspondence with the first microlenses 32a.

In the embodiment described above, the liquid crystal display device having a liquid crystal layer as the display medium layer was exemplified. It should however be noted that the present invention is broadly applicable to, not only liquid crystal display devices, but also electrochromic display devices, electrophoretic display devices, and non-light emitting display devices having electrooptic materials such as PLZT as the display medium layer.

In the microlens array substrate 44, a glass substrate may further be placed on the light outgoing-side surface of the flattening layer (resin layer) 36. The liquid crystal display device can be made lighter in weight and/or thinner without placement of such a glass substrate. However, by placing a glass substrate and forming the transparent electrode and the liquid crystal layer on the glass substrate, the following advantage is obtained.

A transparent electrode finds difficulty in being formed on a layer made of an organic material such as a resin material. On the contrary, a transparent electrode can be easily formed on a layer made of an inorganic material such as glass, and the resultant electrode is resistant to deterioration in film quality, unevenness in film thickness, cracking in the film and the like. Furthermore, without existence of such a glass substrate, an organic substance in the resin layer may be dissolved and enter the liquid crystal layer, or may be discomposed generating gas. The glass substrate can block such adverse effects from the resin material on the liquid crystal material. Thus, adverse effects on the display quality, such as reduction in voltage retention, generation of display variation and reduction in reliability, can be suppressed.

As described above, by use of the dioptric element array substrate of the present invention, an image display apparatus high in light use efficiency and excellent in display quality (color purity, for example) can be provided. Accordingly, the dioptric element array substrate of the present invention is broadly applicable to liquid crystal display devices, electrochromic display devices, electrophoretic display devices, and non-light emitting display devices having electrooptic materials such as PLZT as the display medium layer.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

This non-provisional application claims priority under 35 USC §119(a) on Patent Application No. 2003-335246 filed in Japan on Sep. 26, 2003, the entire contents of which are hereby incorporated by reference.

What is claimed is:

1. A dioptric element array substrate comprising:
   a first dioptric element array having a plurality of first dioptric elements arranged two-dimensionally;
   a second dioptric element array having a plurality of second dioptric elements and comprising a first material having a first refractive index, the array being two-dimensionally in one-to-one correspondence with the plurality of first dioptric elements; and
   a third dioptric element array having a plurality of third dioptric elements and comprising a second material having a second refractive index different from the first refractive index, the second material being contiguous with a surface of the first material, each of the plurality of third dioptric elements is provided adjacent with each other between two second dioptric elements and has a concaved face functioning as a concave lens for a light ray incident from a side of the second dioptric element array,
   wherein principal rays of beams incident on the first dioptric element array at angles different from each other and converged with the first dioptric element array are collimated with the second dioptric element array and the third dioptric element array.

2. The dioptric element array substrate of claim 1, wherein each of the plurality of first dioptric elements is a microlens.

3. The dioptric element array substrate of claim 2, wherein the microlens is aspheric lens.

4. The dioptric element array substrate of claim 1, wherein each of the plurality of second diopitric elements has a shape of a trapezoid.

5. The dioptric element array substrate of claim 1, wherein each of the plurality of second dioptric elements is a microlens.

6. The dioptric element array substrate of claim 1, further comprising a flattening layer on the side of the third dioptric element array opposite from the second dioptric element array,
   wherein the flattening layer has a third refractive index different from the second refractive index.

7. The dioptric element array substrate of claim 6, wherein the flattening layer is made of resin.

8. The dioptric element array substrate of claim 1, further comprising a substrate on the light incoming side of the first dioptric element array,
   wherein the substrate is made of glass.

9. The dioptric element array substrate of claim 6, wherein a relationship N1>N2>N3 is established where N1, N2 and N3 are the first, second and third refractive indexes, respectively.

10. The dioptric element array substrate of claim 6, wherein a relationship N3>N2>N1 is established where N1, N2 and N3 are the first, second and third refractive indexes, respectively.

11. An image display device comprising:
    the dioptric element array substrate of claim 1; and
    a display medium layer provided on the third dioptric element array side of the dioptric element array substrate.

12. The image display device of claim 11, wherein the display medium layer includes a liquid crystal material.

13. An image display apparatus comprising:
the dioptric element array substrate of claim 1;
a display medium layer provided on the third dioptric element array side of the dioptric element array substrate
a light source; and
a color separation device for dividing a beam from the light source into a plurality of color beams having wavelength ranges different from each other.

14. The image display apparatus of claim 13, wherein the display medium layer includes a liquid crystal material.

15. A dioptric element array substrate comprising:
a first dioptric element array having a plurality of first dioptric elements arranged two-dimensionally;
a second dioptric element array having a plurality of second dioptric elements and comprising a first material having a first refractive index, the array being arranged two-dimensionally in one-to-one correspondence with the plurality of first dioptric elements; and
a third dioptric element array having a plurality of third dioptric elements and comprising a second material having a second refractive index different from the first refractive index, the second material being contiguous with a surface of the first material, each of the plurality of third dioptric elements is provided adjacent with each other between two second dioptric element and has a concaved face functioning as a concave lens for a light ray incident from a side of the second dioptric element array,
wherein principal rays of beams incident on the first dioptric element array at angles different from each other and converged with the first dioptric element array are collimated with the second dioptric element array and the third dioptric element array,
further comprising a substrate on the light incoming side of the first dioptric element array, wherein the substrate is made of glass, and
further comprising a middle glass plate provided between the first dioptric element array and the second dioptric element array and an adhesive layer filling a gap formed by the substrate, the middle plate and the first dioptric element array.

16. The image display device of claim 11, each of the plurality of first dioptric elements and each of the plurality of second dioptric elements are provided corresponding to a pixel portion of the display medium.

\* \* \* \* \*